Aug. 17, 1926. 1,596,448
J. E. PARKER
METHOD AND APPARATUS FOR EXTRACTING GOLD AND OTHER METALS
FROM GOLD BEARING STREAMS
Filed Dec. 31, 1923 4 Sheets-Sheet 1

Inventor
Joseph E. Parker,
By Adam E. Fisher
Attorney

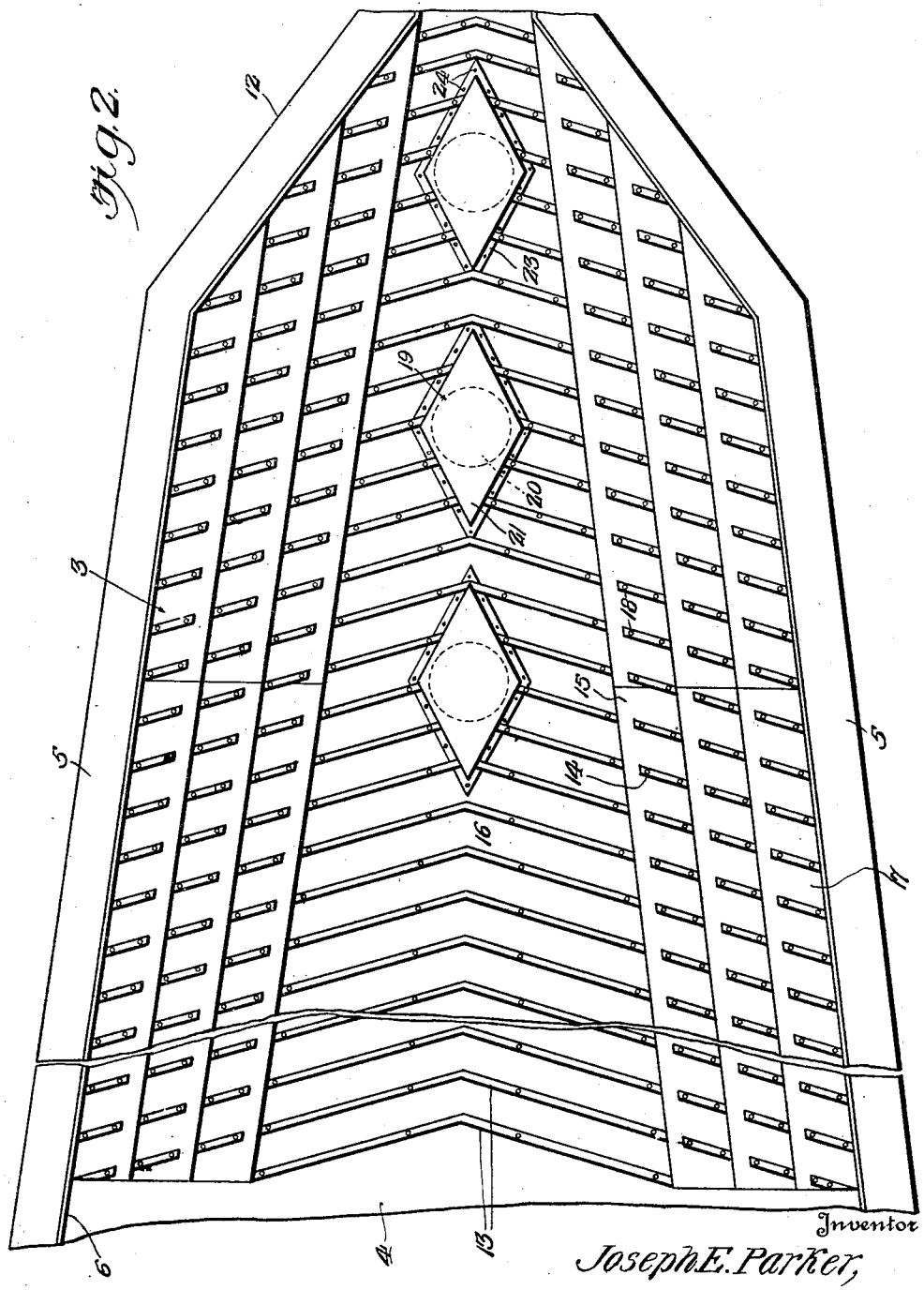

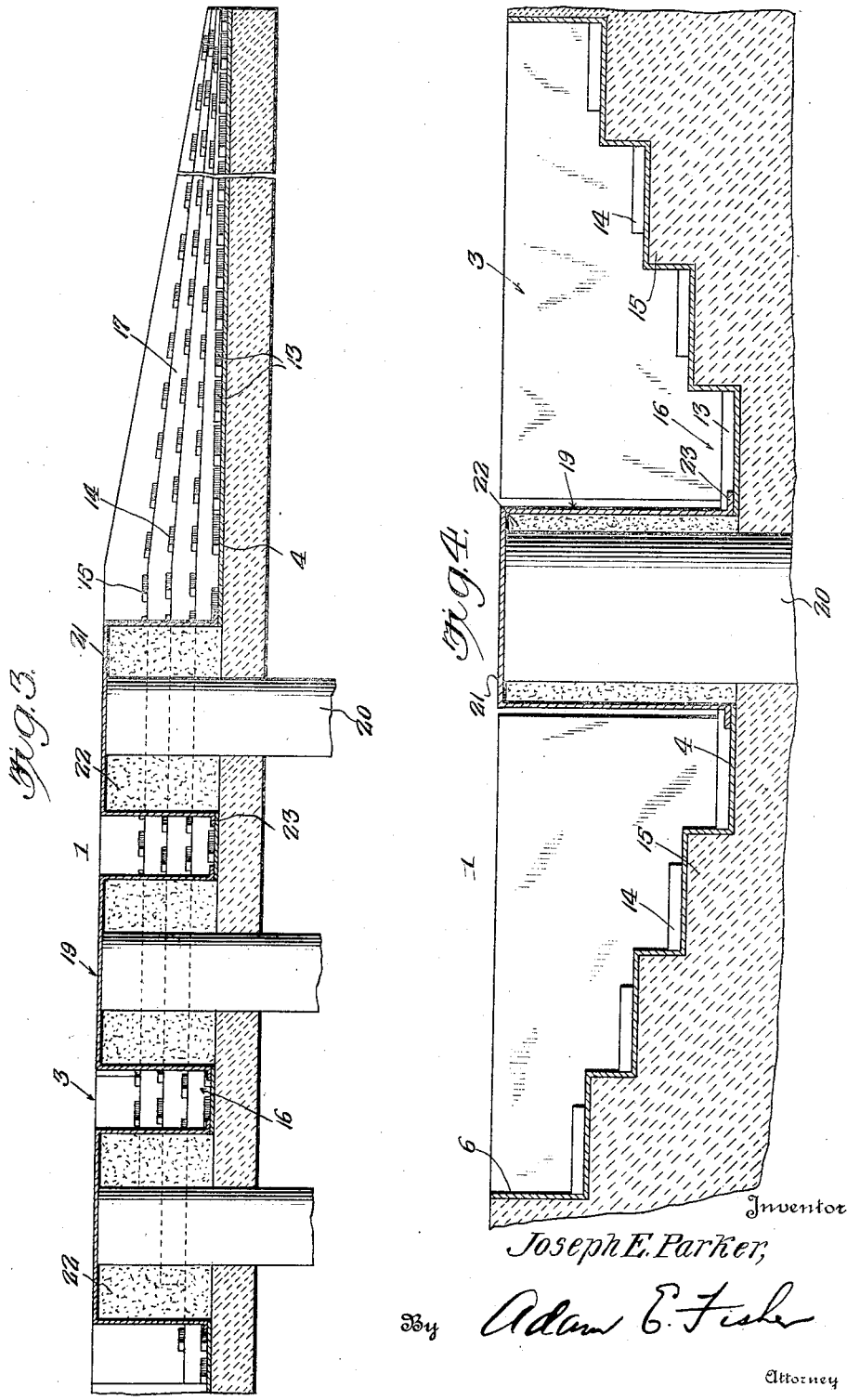

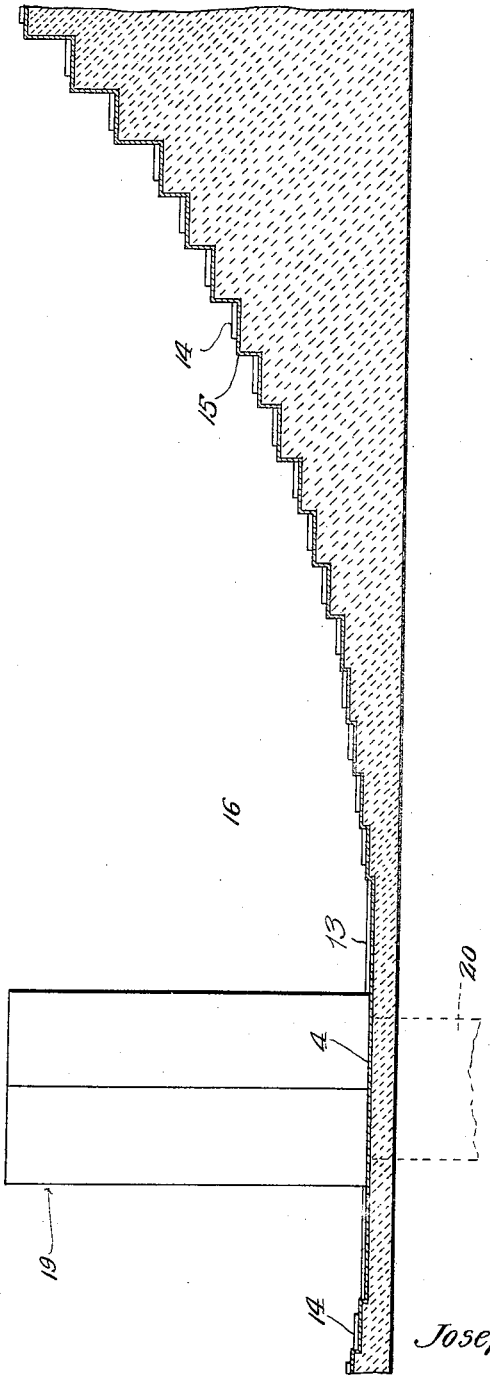

Patented Aug. 17, 1926.

1,596,448

UNITED STATES PATENT OFFICE.

JOSEPH E. PARKER, OF BUFFALO, NEW YORK.

METHOD AND APPARATUS FOR EXTRACTING GOLD AND OTHER METALS FROM GOLD-BEARING STREAMS.

Application filed December 31, 1923. Serial No. 683,785.

The invention relates to a process and apparatus for extracting gold and other metals from gold bearing streams.

It is an object of the present invention to provide an apparatus designed to be installed adjacent to a gold bearing stream and to divert temporarily the water therefrom and cause the same to pass through the apparatus and during its passage through the apparatus to be subjected to practically the same conditions which are present in a natural stream whereby gold and other metals deposited at the bottom and on the banks of a natural stream will be deposited and caught and saved by the apparatus together with the finer and lighter gold.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:

Figure 2 is an enlarged plan view of the trap portion of the apparatus, only a few of the ledges of the step-like side portions being shown to facilitate illustration of the details of construction.

Figure 3 is a longitudinal sectional view of the same.

Figure 4 is a transverse sectional view of the trap portion of the apparatus.

Figure 5 is a transverse sectional view through one side of the trap portion of the apparatus, illustrating more fully the construction of the step like formation at opposite sides of the central or channel portion of the trap.

Figure 1:
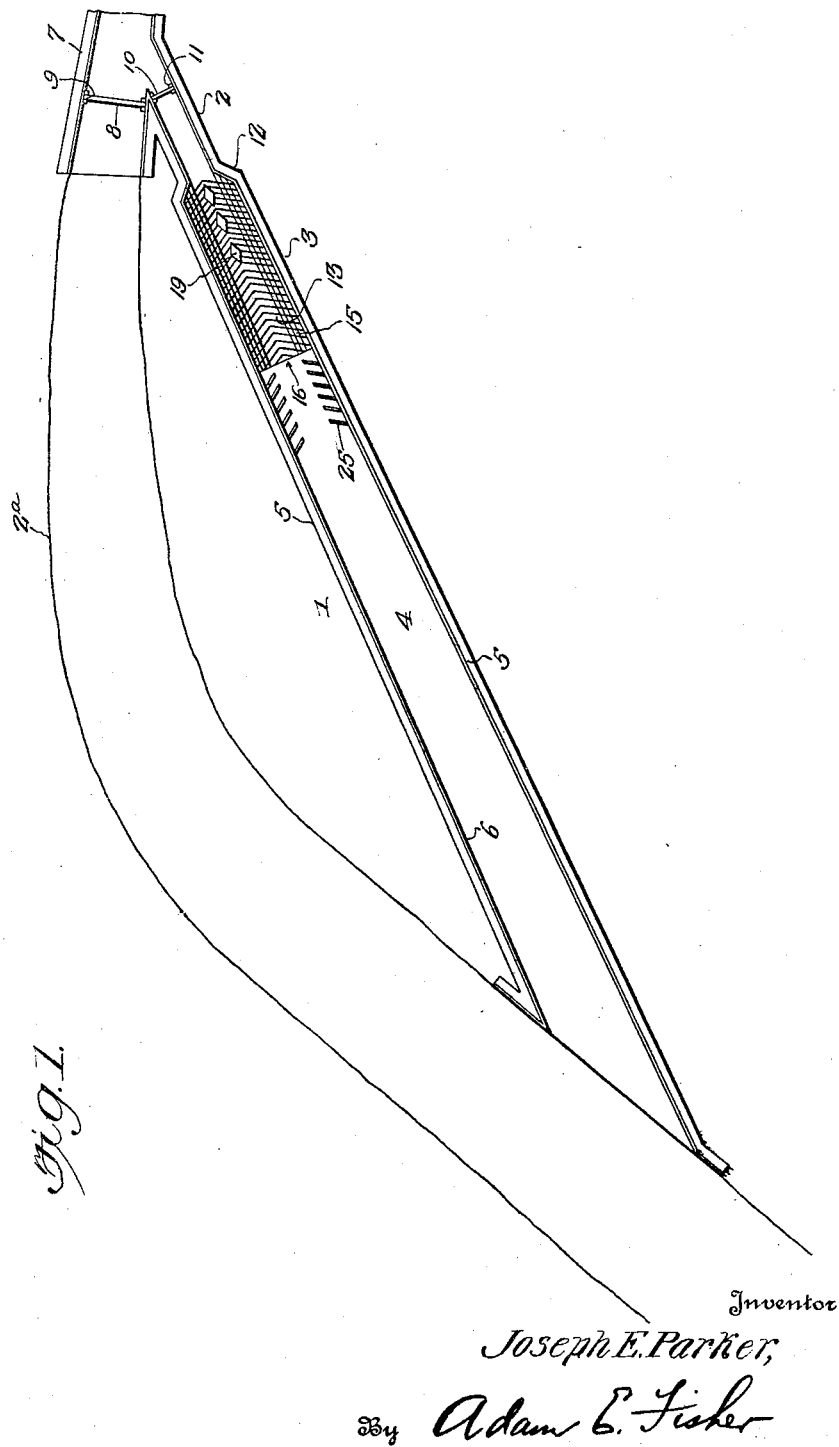
Figure 1 is a plan view of an apparatus constructed in accordance with this invention and shown applied to a stream.

In the accompanying drawings in which is illustrated the preferred embodiment of the invention, the gold extracting apparatus consists in an open top conduit 1, designed to extend along a portion of a gold bearing stream 2ª and to divert temporarily therefrom the water thereof and cause the water to pass through it and return to the stream 2ª at a lower point on the same. The conduit is designed where practical to be arranged at a bend in the stream and to connect with the same at an acute angle to the upper portion of the stream and at a similar angle to the lower portion of the stream to facilitate diverting the water of the stream into the apparatus and also to enable the water from the conduit to be discharged into the stream at such an angle to the direction of the current as will reduce to a minimum the resistance offered by the opposite bank. In other words, the discharge end of the conduit should be arranged to permit the water to flow into the channel of the stream without injury to the banks thereof or the bottom of the same whereby reinforcement of the bottom and banks at the discharge end of the conduit will be rendered unnecessary. The conduit is provided at its mouth or entrance with a constricted or neck section 2 and adjacent to the latter with a trap section 3 and it is composed of a bottom 4 and side walls 5 of reinforced concrete or other suitable material having a lining 6, of sheet steel or other suitable material adapted to protect the concrete and present smooth surfaces to the water and at the same time render the conduit water tight at the bottom and sides. The conduit is preferably connected with a reinforced concrete mouth section 7, equipped with a vertically slidable gate 8, operating in suitable guides 9, and adapted to be closed to form a dam and a gate for shutting off the water of the stream from the portion adjacent the conduit and to cause the water to flow into the conduit. The conduit is also provided at the neck 2, with a vertically slidable gate 10 operating in suitable guides 11, and adapted to be opened to permit the water of the stream to flow into the conduit. While the gates are indicated as being vertically slidable, they may be of any preferred construction and may in practice be operated in any suitable manner. When it is desired to shut off the water from the conduit and cause the water to flow through the bed of the stream, the gate 10 is closed and the gate 8 is opened. This will afford access to the trap for the purpose of removing the contents or for repair of the apparatus or any other purpose.

In applying the apparatus to a stream or river, a cut is made at a bend of the river with the same fall as the river or stream, and heavy cement walls 5 and a heavy cement floor or bottom are constructed in the cut. These walls will be of sufficient height and strength to take care of all water passing down the stream or river in all conditions of the same, especially all high water. In practice, the neck 2 will preferably be constructed approximately two-thirds of the width of the stream or river. This, as hereinafter explained, will be ample to maintain a strength of current sufficient to carry all rocks and similar material so that such rocks will be carried out of the conduit by the water bearing them into the same and will be prevented from accumulating within and clogging the apparatus. Any other suitable proportions may of course be employed. As the water leaves the race or neck 2, in which it is constricted, it spreads out into approximately fan shape and is subjected to the action of riffles 13, of the bottom of the trap and of riffles 14 arranged upon ledges 15 of side portions of substantially step like formation located at opposite sides of the central or channel portion 16, and adapted to gradually reduce the depth of the water to the sides of the apparatus where the water will, as hereinafter explained, have only a very shallow depth of a few inches. The riffles 13, are slightly V-shaped and are inclined from the center of the direction of the flow of the current through the apparatus, and they extend entirely across the channel or bottom portion to the lowermost ledges 15 of the step like side portions of the trap. The faces or ledges of the step like side portions of the trap are approximately horizontal throughout the main portion or body of the trap and are inclined downwardly in the direction of the flow of the current as shown in Fig. 3 at 17 in the exit portion of the trap for lowering the general level of the water within the conduit and reducing the depth to enable the water leaving the conduit to enter into the stream near its natural condition but with sufficient strength to carry the rocks and similar material back into the stream after the gold has been separated therefrom.

The riffles 14, which are arranged upon the faces or ledges of the step like side portions of the trap extend from the vertical riser portions or shoulders of the steps and terminate short of the edge of the step or ledge, thereby interrupting the series or sets of riffles and forming spaces for the uninterrupted passage or flow of water. These riffles 14 are inclined or angularly disposed and extend in the direction of the flow of the current and they form at each ledge, inner pockets or protective portions for the accumulation of gold or other valuables during the passage of the water through the conduit. The riffles are designed in practice to be detachably secured to the steel plates lining the bottom and walls of the conduit by bolts 18 or other suitable fastening means to enable them when worn or broken to be readily removed and in practice the concrete of which the conduit is constructed will be anchored by any suitable means.

The water and the material carried by the same is deflected laterally from the central or channel portion of the trap by substantially diamond shaped deflecting elements 19 arranged at intervals and having their major axis arranged longitudinally of the trap as clearly illustrated in figure 2 of the drawings and preferably composed of piles 20 and metallic caps 21 of steel or other suitable material. The piles may be of any desired number and they extend through the floor or bottom of the conduit and are driven into the ground and the space between the piles and the steel caps 21 is provided with a filling 22 of concrete or other suitable material, and any suitable means may be employed for providing such filling. When a plastic material is employed as shown in the accompanying drawings, it may be molded prior to the placing of the caps in position and the caps are provided with attached flanges 23 located at the lower edges of the walls of the cap and detachably secured to the lining of the bottom or floor of the conduit by bolts 24 or other suitable fastening means. This will permit the caps to be removed and renewed when required. The oppositely inclined faces of the deflecting elements will cause the water and material carried by the water to be deflected from the central channel portion of the trap to the step like side portions of the same as hereinafter fully described.

The interior or lining of the neck 2 is smooth and the conduit below the trap may be provided with riffles 25 extending from the opposite walls of the conduit as indicated in figure 1 of the drawing and these may of course be of any desired number and are spaced apart or interrupted as shown to provide for an uninterrupted smooth passageway for water while the riffles form the protecting pockets for catching the gold and other valuables. After the water leaves the race or neck 2, it spreads out into a substantially fan shape and flows over the step shaped side portions. By reference to Figure 5 of the drawings it will be seen that the riffles 13 which rest upon the bottom or floor of the central or channel portion of the trap have their upper faces located below the ledge or upper face of the first step and in practice, the ledges or faces of the steps will preferably be eight inches in width, but the width of the ledges or steps may of course, be varied as will be readily understood. As illustrated in Figure 5, it is designed to provide five steps with similar rise which in practice will be one inch. The next series of steps which are preferably three in number is designed to have a rise of two inches and the next series of steps which are three in number are designed to have a rise of three inches each. The next series of steps which are three in number is designed to have a rise of four inches while the succeeding steps preferably have a rise of six inches each and may be carried at any desired extent to provide for a conduit of the required width. The first series of five steps will have a width of forty inches, and a total rise of five inches above the floor or bottom of the conduit. The next series of steps will provide for a total rise of six inches, the third series a total rise of nine inches, and the fourth series, a total rise of twelve inches. The eighth step is sixty-four inches away from the bottom of the conduit and is located at an elevation of eleven inches; the eleventh step is twenty inches higher than the bottom or floor and is eighty-eight inches away from the bottom, and the fourteenth step is thirty-two inches higher than the floor or bottom and is one hundred twelve inches from the same. Twenty more steps rising six inches each would produce an elevation of twelve feet and eight inches above the bottom or floor and twenty-two feet and eight inches away from the bottom. The steps at each side of the conduit are constructed the same and the risers of the side portions are uniform with each other. The inclined portions of the ledges involve a widening out of the fan shape and will produce a gradual descending of the side portions of the trap and will bring the side portions of the conduit in the same plane as the central portion at the terminals of the said inclined portions as will be readily apparent. The water will thus be let back to the floor or bottom of the conduit at approximately the level of the river and it will be seen that when the water leaves the race or neck, it is caused to spread out and rise over the steps and then further spread and decrease in depth until it approaches the level of the stream, the lower or outlet portion of the conduit being approximately two-thirds the width of the stream in order to maintain an ample carrying capacity of the water for removing from the conduit the stones and gravel brought into the conduit by the water. When it is desired to turn the water into the conduit, the gate 10 of the neck is raised and the gate 8 of the stream is lowered and when it is desired to make a clean up of the apparatus or to repair the same, the gate of the old stream will be raised and the gate of the apparatus will be lowered, allowing the water to drain off of the apparatus and take its original course through the bed of the stream. The widest part of the apparatus must be less than the width of the old stream as the flow of water must be maintained strong enough in the apparatus to transport through it all the rocks that are being transported by the old stream and by maintaining such condition, all the rocks transported into the apparatus will pass through the same.

The heavy gold crawling in the channel of the stream and the light gold such as flake and flour gold being distributed through the water, the saving of the major portion of the gold is effected in the following manner. When the gold bearing gravel passes through the race or neck 2 owing to the swiftness of the water, it will be greatly agitated and the lighter gold bearing gravel distributed through the water more than in the old river or stream, causing a greater distribution of the lighter gold and gold bearing gravel than was the case in the old stream. Both the gravel and water will hit the diamond shaped deflecting elements 19 with great force which will result in the gold bearing gravel shooting out at each side. As the diamond shaped deflecting elements extend above the surface of the water at all times, this effect will also be the case with the light gold such as flour or flake gold etc., suspended in the water. When this deflection takes place, the gold bearing gravel will seek the points of least resistance and the heaviest gold will catch behind the fingers or riffles on the floor of the conduit and remain there. The next heaviest will catch behind the riffles of the first step, the next on the second step, the next on the third step and so on. The gravel which strikes the riffles will pass over the same and will become agitated in passing over the riffles and the heavier gold will be caught by the riffles and the lighter gold and gravel will rise to the next succeeding step where the same process of agitation will take place, the heavier gold being caught by the riffles and the lighter gold and gravel rising and moving laterally to the succeeding higher steps, where the same process occurs again and again, the gold bearing gravel continually seeking the points of least resistance and becoming trapped and held in the pockets formed by the riffles on the faces of the steps. The gravel which is passing through the spaces between the sets or series of riffles of the steps will seek points of least resistance and will be carried into the pockets formed by the fingers or riffles where the same process of agitation occurs, resulting in the gold being retained and the gravel being carried over the riffles.

With the bottom resting 13 feet below the surface of the water, 40 inches away from its outer edge the water would be reduced to 12 feet and 7 inches; 64 inches away it would be reduced to 12 feet and 1 inch; 88 inches away, it would be reduced to 11 feet and 4 inches; 112 inches away it would be reduced to 10 feet and 4 inches; and 272 inches away, it would be reduced to 4 inches. This gradual reduction in the water pressure assures points of least resistance. As the flake and flour gold are suspended in the water and pass down stream unless they come in contact with some obstruction which will stop them, the object is to arrange the trap or obstruction in the most convenient way. With the deflection of the water from the diamond shaped deflecting elements, the major portion of this gold will be caused to come in contact with one of the traps formed by the riffles or cleats and when once caught, it will be firmly held by the pressure of the water and will be prevented from leaving the pocket or trap portion of the apparatus. As an illustration of this action, if a piece of paper be placed in front of the windshield of a car running at thirty miles an hour, the paper will remain in such position as long as the speed is maintained. In a like manner, place a flake of gold against one of the fingers or riffles and the continual water pressure will hold it there. Gold, on account of its specific gravity and small displacement, when once caught in the trap remains. Rock, on account of its lightness and great displacement as compared with gold is carried over the fingers or riffles.

The main points in catching gold in a gold bearing stream are as follows:

1. Means are provided for coming in contact with and trapping the major portion of the gold passing down the stream.

2. As it is well known that flake or flour gold will float in a swiftly moving stream, means are provided whereby such gold will be diverted from the channel into weaker currents of water.

3. The diamond shaped deflecting elements deflect the current throwing the gravel and gold into weaker currents of water and breaking it loose from the grip of the current, where it comes in contact with the riffles on the different steps. The diamond shaped deflectors also operate as agitators as is the case with the riffles on the various steps.

It it a well known fact that large quantities of flake gold are floating on the surface of the water near the edge of the stream, having sought the point of least resistance, and as with the present apparatus, there can at no time be more than six inches of water between the surface of the water and the face of the step, and will generally average about three inches in depth. The carrying capacity of the water is so reduced that the gold will be deposited and trapped at the edges of the water.

As the greatest quantity of gold is passing down these streams during the time of rising water or flood, it will be apparent that the trap is designed to take care of water of various depths and to produce exactly the same trapping conditions with all depths of water thus insuring the extracting from the water of all grades of gold carried by a gold bearing stream. It will also be noted that the same action occurs when the water is falling, and that although the apparatus is stationary, it performs its work perfectly with the water rising, falling or normal.

It will be noted that the trap is perfect in its operation in the agitation and distribution of the gold and gold bearing gravel through the tremendous power of the water produced by constricting the same in the neck or race. A second great agitation occurs when the water and the material carried by the same strike the first diamond shaped deflecting element and the deflection of the current produces agitation at the riffles and the gradual weakening of the flow of water, as the material moves toward the edge. The fan shaped or tapering character of the trap also causes the flow of water to become weak and weaker at the edge as it proceeds down stream. It will also be noted that where the water is strong enough to lift a rock to a step, the water will also be strong enough to transport the rock on down stream where it is strong enough to lift a rock to the step and carry it downward. It will be clear that there is no accumulation of rock in the trap and that the arrangement of the steps and the trapping means formed by the riffles produces a distribution of the gold over the trap and a grading of the same, but at no time will a rock be lifted to a place where the water is too weak to transport it.

Furthermore, it will be noted that the gravel passing through the race and striking the widest part of the stream there will be a natural tendency for the lighter material to shoot out on each side to the wider places, but with the trap in addition to this natural tendency, there have been added two more causes for the material to shoot out and become graded, viz, the diamond shaped deflectors and the weakening of the water flow at opposite sides of the trap. The trap almost conforms closely to a natural stream, the water being deepest in the center which represents a channel and gradually becoming more shallow towards each edge.

The old form of sluice box used on the surface and composed of a bottom and side walls and provided with cross pieces or riffles secured to the bottom, generally has four to six inches of water running through the same and it is well known that the light gold is carried off with the stream of water and is lost, the heavy gold only being saved and the reason for this is that the same power of water is used for all the gold which varies materially in weight. With the present method, a separation or segregation takes place. The heaviest gold is caught at the bottom of the conduit, while the next heaviest is trapped by the riffles on the first step and the next heaviest by the riffles on the second step and so on until the edge of the water is reached where the lightest gold is trapped by the adjacent riffles.

Also with a sluice box on a bank of a stream, the water is confined to a comparatively small trough with the same water power throughout the entire length of the sluice box whereas with the present invention, the water of varying depth is distributed over the conduit for taking care of the gold of different weights. While the present invention is designed particularly for catching gold and other metals in moving gold bearing streams, it may also be advantageously employed in placer mining and the apparatus may be arranged to operate within a stream as well as at one side of the same, suitable means being of course provided for enabling the water to be run through the apparatus and to be turned therefrom for cleaning up, repair work and so forth. Also, while the conduit is preferably constructed straight or approximately straight as illustrated in the accompanying drawings, it may be of any other desired form, and it may be reversed with respect to the entrance and exit portions of the conduit and the trapping portions with the means for subjecting the material carried by the water to different depths thereof, may be arranged in any other desired manner. Any desired number of the diamond shaped abutment members may of course be employed and the abutment members may of course, be of any other preferred shape. Also the rise of the steps and the tread or ledge face of the same may be varied and the arrangement of the separate series of steps of different heights may be varied as desired.

Furthermore, it will be clear that the present invention can be operated more cheaply than the quartz miner can operate with the high cost of labor, explosives and transportation and smelter charges, and more cheaply than the dredge with its costly operation and upkeep and cheaper also than spading gravel into a sluice box by hand and sluicing the same, as none of these methods can compete with the operation of the apparatus by water which will perform its labor free of cost continuously for twenty-four hours of the day where desired.

What is claimed is:

1. An apparatus for extracting gold and other metals from flowing water of gold bearing streams comprising a conduit having an angularly disposed inlet constituting a section of the length of a stream, said conduit being composed of a bottom and side walls and designed to connect with two portions of a stream and having a constricted neck to increase the depth and speed of water and provided with a trap section having a central channel portion and side portions decreasing in depth from the channel portion to the sides of the conduit.

2. An apparatus for extracting gold and other metals from flowing water of gold bearing streams comprising a conduit having an angularly disposed inlet constituting a section of the length of a stream, said conduit having a bottom and side walls and designed to connect with two portions of a stream and provided with a trap section having a central channel portion and side portions decreasing in depth from the central portion towards the side walls of the conduit.

3. An apparatus for extracting gold and other metals from flowing water of gold bearing streams comprising a conduit having an angularly disposed inlet constituting a section of the length of a stream, said conduit being composed of a bottom and side walls and designed to connect with two portions of a stream and having a trap section provided with a channel portion and side portions decreasing in depth from the channel toward the side walls, said trap section being tapered to vary the width of the conduit.

4. An apparatus for extracting gold and other metals from flowing water of gold bearing streams comprising a conduit having an angularly disposed inlet constituting a section of the length of a stream, said conduit being composed of a bottom and side walls and designed to connect two portions of a stream and having a constricted neck portion to increase the depth and speed of the water and provided with a tapered trap section having a central channel portion and side portions decreasing in depth from the center to the sides.

5. An apparatus for extracting gold and other metals from flowing water of gold bearing streams comprising a conduit having an angularly disposed inlet constituting a section of the length of a stream, said conduit having a bottom and side walls and designed to connect with two portions of a stream, said conduit having a constricted entrance neck and a trap section of greater width than the neck decreasing in depth from the central portion to the sides and means contained in the trap section for trapping metal.

6. An apparatus for extracting gold and other metals from flowing water of gold bearing streams comprising a conduit having an angularly disposed inlet constituting a section of the length of a stream, said conduit having a bottom and side walls and provided with a constricted neck section and a trap section of greater width than the neck section, decreasing in depth from the central portion towards the sides, said trap section increasing in width from the neck section to gradually increase the width of the water within the conduit with the varying depth of the same and means located within the trap section for trapping metals.

7. An apparatus for extracting gold and other metals from gold bearing streams comprising a conduit having a bottom and side walls and provided with a trap section having side portions of step like formation decreasing the depth of the water from the center toward the side walls.

8. An apparatus for extracting gold and other metals from flowing water of gold bearing streams comprising a conduit having an angularly disposed inlet constituting a section of the length of a stream, said conduit having a bottom and side walls and provided with a constricted neck section and having a trap section having side portions of step like formation forming a central channel and decreasing the depth of the water from the channel towards the side walls.

9. An apparatus for extracting gold and other metals from gold bearing streams comprising a conduit having a bottom and side walls and provided with a constricted neck section and having a trap section having side portions of step like formation forming a central channel and decreasing the depth of the water from the channel towards the side walls, and riffles forming pockets at the center and side portions of the trap section and arranged at different elevations.

10. An apparatus for extracting gold and other metals from gold bearing streams comprising a conduit having a bottom and side walls and provided with a constricted neck section and having a trap section having side portions of step like formation forming a central channel and decreasing the depth of the water from the channel towards the side walls, and riffles forming pockets at the central and side portions of the trap section and interrupted at intervals to form longitudinal passages between the riffles.

11. An apparatus for extracting gold and other metals from gold bearing streams comprising a conduit having a bottom and side walls and provided with a constricted neck section and having a trap section having side portions of step like formation forming a central channel and decreasing the depth of the water from the channel towards the side walls, and riffles forming pockets and arranged at the central and side portions of the trap section and angled laterally in the direction of the flow of water.

12. An apparatus for extracting gold and other metals from gold bearing streams comprising a conduit having a bottom and side walls and provided with a constricted neck section and having a trap section having side portions of step like formation forming a central channel and decreasing the depth of the water from the channel towards the side walls, and riffles forming pockets and arranged at the central and side portions of the trap section and angled laterally in the direction of the flow of water, and interrupted at intervals to form longitudinal passages.

13. An apparatus for extracting gold and other metals from gold bearing streams comprising a conduit having a bottom and side walls and provided with a trap section having side portions decreasing the depth of the water from the central portion towards the side walls, said side portions being provided with means for trapping metals and fixed elements arranged to deflect the water and metals towards the trapping means.

14. An apparatus for extracting gold and other metals from gold bearing streams comprising a conduit having a bottom and side walls and provided with a trap section having side portions decreasing the depth of the water from the central portion towards the side walls, and side portions being provided with means for trapping metals, and fixed elements rising from the bottom of the conduit and arranged to deflect water and metals towards the trapping means.

15. An apparatus for extracting gold and other metals from gold bearing streams comprising a conduit having a bottom and side walls and provided with a trap section having side portions decreasing the depth of the water from the central portion towards the side walls, said side portions being provided with means for trapping metals, and fixed elements extending from the bottom of the conduit to the surface of the water and arranged to deflect water and metal laterally.

16. An apparatus for extracting gold and other metals from gold bearing streams comprising a conduit having a bottom and side walls and provided with a trap section having side portions decreasing the depth of the water from the central portion towards the side walls, said side portions being provided with means for trapping metals, and fixed deflecting posts rising from the bottom of the conduit at the central portion thereof and arranged to deflect water and metals towards the trapping means.

17. An apparatus for extracting gold and other metals from gold bearing streams comprising a conduit having a bottom and side walls and provided with a trap section having side portions decreasing the depth of the water from the central portion towards the side walls, said side portions being provided with means for trapping metals, and fixed deflecting elements arranged within the conduit and having angularly disposed side faces to deflect water and metals laterally toward the trapping means.

18. An apparatus for extracting gold and other metals from gold bearing streams comprising a conduit having a bottom and side walls and provided with a trap section having side portions decreasing the depth of the water from the central portion towards the side walls, said side portions being provided with means for trapping metals, and deflecting elements arranged within the conduit and having oppositely disposed faces arranged at an angle to direct water and metals towards the trapping means.

19. An apparatus for extracting gold and other metals from gold bearing streams comprising a conduit having a bottom and side walls and provided with a trap section having side portions decreasing the depth of the water from the central portion towards the side walls, said side portions being provided with means for trapping metals, and substantially diamond shaped deflecting posts located within the conduit and presenting angularly disposed side faces for deflecting water and metal towards the trapping means.

20. An apparatus for extracting gold and other metals from gold bearing streams comprising a conduit having bottom and side walls and provided with a trap section having side portions of step like formation forming a central channel and decreasing the depth of the conduit from the channel towards the sides of the said conduit and substantially diamond shaped deflecting elements located within the channel portion of the trap for deflecting water and metals.

21. An apparatus for extracting gold and other metals from gold bearing streams comprising a conduit having bottom and side walls and provided with a trap section having side portions of step like formation forming a central channel and decreasing the depth of the conduit from the channel towards the sides of the conduit and riffles located at the center and side portions of the trap and arranged to form pockets and substantially diamond shaped deflecting elements located in the channel portion of the trap for deflecting water and metals toward the pockets.

22. An apparatus for extracting gold and other metals from gold bearing streams comprising a conduit having a bottom and side walls and provided with a trap section having side portions of step like formation forming a channel and decreasing the depth of the conduit from the channel to the sides of the conduit, and riffles arranged at the center and side portions of the trap and interrupted at intervals to arrange the riffles in separate series and to form longitudinal passages between the series of riffles, and fixed deflecting elements arranged in the channel of the trap section and presenting angularly disposed side faces for deflecting water and metals to the said riffles.

23. An apparatus for extracting gold and other metals from gold bearing streams comprising a conduit having a bottom and side walls and provided with a trap section having side portions of step like formation forming a channel and decreasing the depth of the conduit from the channel to the sides of the conduit, riffles angled laterally in the direction of the flow of water and interrupted at intervals to provide passages between the riffles and fixed deflecting elements having angularly disposed side faces for deflecting water and metals towards the riffles.

24. An apparatus for extracting gold and other metals from gold bearing streams comprising a conduit having a bottom and side walls and provided with a trap section having side portions of step like formation forming a channel and decreasing the depth of the conduit from the channel to the sides of the conduit, riffles arranged at the center and side portions of the trap section and interrupted at intervals to provide passages for the flow of water, said riffles being angled in the direction of the flow of water and fixed deflecting posts rising from the central portion of the trap section and presenting angularly disposed side faces for deflecting water and metals toward the riffles.

25. An apparatus for extracting gold and other metals from gold bearing streams comprising a conduit having a bottom and side walls and provided with a trap section having side portions of step like formation forming a channel and decreasing the depth of the conduit from the channel to the sides of the conduit, approximately V-shaped riffles arranged at the central portion of the trap section and extending laterally in the direction of the flow of water and separate series of riffles arranged at the side portions of the trap section and spaced apart to provide longitudinal passages for the flow of water, and fixed deflecting elements for deflecting the water and metal towards the riffles of the side portions.

26. An apparatus for extracting gold and other metals from gold bearing streams comprising a conduit having a bottom and side walls and provided with a trap section having side portions of step like formation forming a channel and decreasing the depth of the conduit from the channel to the sides of the conduit, approximately V-shaped riffles arranged at the central portion of the trap section and extending laterally in the direction of the flow of water and separate series of riffles arranged at the side portions of the trap section and spaced apart to provide longitudinal passages for the flow of water, and substantially diamond shaped deflecting posts rising from the central portion of the trap section and presenting angulary disposed side faces for deflecting water and metals toward the side portions of the trap section.

27. An apparatus for extracting gold and other metals from gold bearing streams comprising a conduit adapted to receive water and having a trap provided with side portions of step like formation composed of ledges arranged at different elevations, said ledges having inclined terminal portions extending in the direction of the flow of water.

28. An apparatus for extracting gold and other metals from gold bearing streams comprising a conduit adapted to receive water and having a trap provided with side portions of step like formation decreasing the depth of the conduit from the center towards the sides and presenting ledges arranged at different elevations and trapping means arranged on the ledges and terminating short of the longitudinal edges thereof to provide passages between the trapping means.

29. An apparatus for extracting gold and other metals from gold bearing streams comprising a conduit having a trap section tapering in width to increase the width of the stream in the direction of the flow, said trap section being provided with side portions decreasing the depth of the trap from the center towards the sides and presenting ledges arranged at different elevations, trapping means carried by the ledges and fixed deflecting means located between the side portions of the trap section and arranged to deflect water and metal towards the said side portions and means for increasing the speed and depth of the water at a section of the conduit.

30. An apparatus for extracting gold and other metals from gold bearing streams comprising a conduit having a bottom and side walls and provided with a metallic lining, said conduit having a trap section provided with side portions of step like formation decreasing the depth of the conduit from the center towards the sides and fixed deflecting elements located between the side portions of the trap section and consisting of posts, piles and metallic caps covering the piles.

31. The herein described method of extracting gold and other metals from gold bearing streams consisting in diverting the water entirely from a portion of the length of the stream, passing the diverted water of the stream through a conduit, increasing the speed and depth of the water through a portion of the conduit and decreasing the depth of the water from the center to the sides of the conduit and trapping the metal at different depths.

32. The herein described method of extracting gold from gold bearing streams consisting in diverting the water entirely from a portion of the length of the stream, passing the diverted water of the stream through a conduit, varying the depth of the water from the center of the conduit to the sides thereof for decreasing the carrying capacity of the water to cause the same to deposit gold and other metals according to the weight thereof and trapping the metals at different depths.

33. The herein described method of extracting gold from gold bearing streams consisting in diverting the water entirely from a portion of the length of the stream, passing the diverted water in the stream through a conduit of a width less than that of the stream, decreasing the depth of the water within the conduit from the center to the sides to reduce the carrying capacity of the water and cause the same to deposit gold and other metals and increasing the width of the conduit with the decrease in the depth of the water.

34. The herein described method of extracting gold and other metals from gold bearing streams consisting in diverting the water entirely from a predetermined length of a stream, passing the diverted water of the stream through a conduit of a width less than that of the stream, constricting the water in a portion of the conduit to increase the depth and speed of the water, gradually decreasing the depth of the water from the center to the sides of the conduit in another portion of the conduit while increasing the width of the stream and finally increasing the depth of the water with an increasing width of the conduit in another portion of the latter.

In testimony whereof I have hereunto set my hand.

JOSEPH E. PARKER.